Jan. 30, 1940.     T. E. WOODROFFE     2,188,696

RODENT OR ANIMAL TRAP

Filed Sept. 1, 1938

Tom Ernest Woodroffe
INVENTOR.

By *[signature]*
his ATTY.

Patented Jan. 30, 1940

2,188,696

UNITED STATES PATENT OFFICE 2,188,696

RODENT OR ANIMAL TRAP

Tom Ernest Woodroffe, Otahuhu, Auckland, New Zealand

Application September 1, 1938, Serial No. 227,909
In New Zealand September 30, 1937

2 Claims. (Cl. 43—81)

This invention relates to traps for rodents or animals and particularly to rat traps, the objects of the invention being the provision of a trap with improved release mechanism which will render it a more effective article.

It is well known with present spring traps that on quite numerous occasions the bait is taken without the trap being released, but consideration of the action of rats reveals the fact that in taking the bait, they pull at same in many cases without any preliminary pushing action, the pushing or depressing action being the one which is necessary in order to release the trap.

By my invention, the action of the rat in removing the bait is immaterial, the release mechanism being such that the removal of the bait causes removal of the medium which is holding the trap in unreleased position.

Broadly the invention comprises improvements in known traps of the type wherein a wound tension spring mounted on a base has a striking frame adapted on release, to spring across from side to side of the base, improved release mechanism being provided to such traps wherein the bait is disposed in such manner as to act as the medium which holds the trap in unreleased position.

Figure 1:
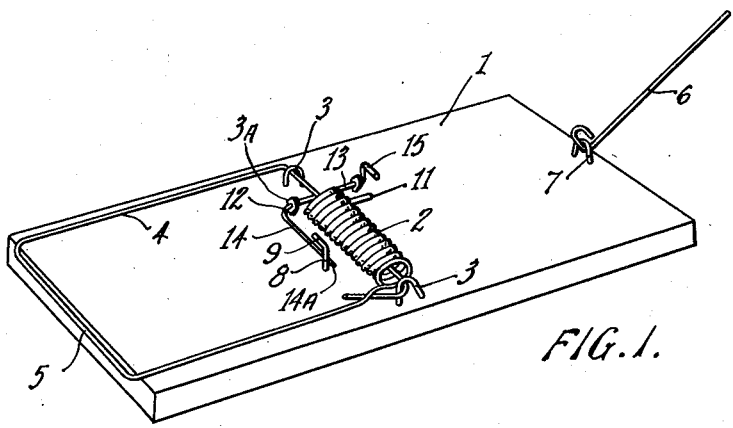
Figure 2:
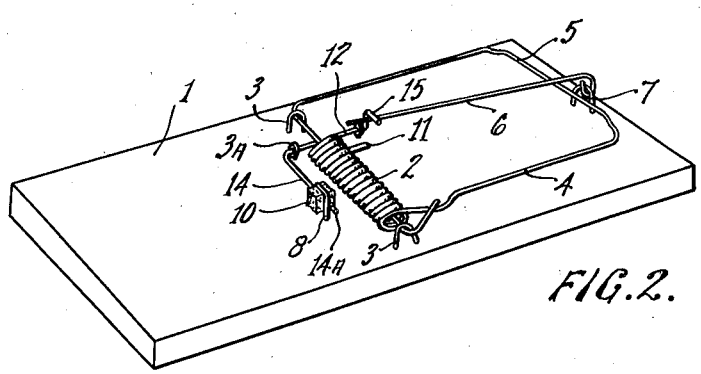
Figure 3:
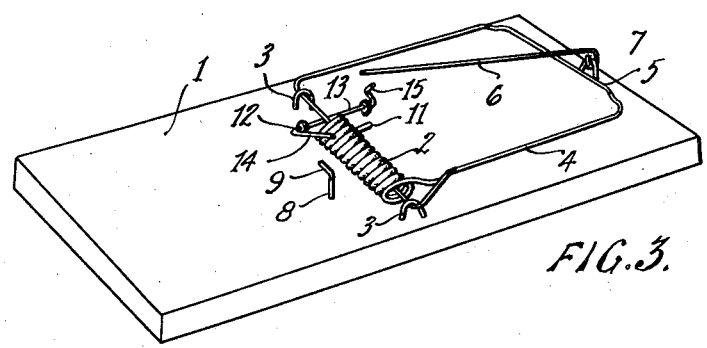

In describing the invention, reference will be made to the accompanying drawing in which, Fig. 1 shows a perspective view of the trap in released position, Fig. 2 is a view of the trap in set position, and Fig. 3 shows a trap at the instant of release before the striking frame has moved to the released position as shown in Fig. 1.

In the invention there are the known spring trap units comprising a base 1, a wound tension spring 2 which is held to the base 1 by staples or like 3 and from which extends a rectangular striking frame 4 the outer end 5 of which is adapted to be engaged by a holding lever 6 which is pivotally held by a staple or like 7 secured in the base 1.

To these known units of apparatus, the new improved releasing mechanism is applied comprising a bait holder 8 which is a right angle hook member having a horizontal upper portion 9 between which and the base 1 a piece of bait 10 can be placed, this bait holder 8 being secured to base 1 near a side of the spring 2.

Passing under the spring 2 near one of its ends there is a trip lever 12 made from material such as spring steel wire, this trip lever 12 having a portion 13 pivotally secured to the base 1 by staples or like 3A and from opposite ends of this portion 13 there is a bait engaging arm 14 and a tripping arm 15, these arms 14 and 15 being at opposite sides of the spring 2.

The bait engaging arm 14 extends across the base 1 to have its end 14A disposed adjacent to the bait holder 8 and just sufficiently to the side thereof to enable end 14A to move upwardly without touching said holder 8, the tripping arm 15 being bent upwardly first of all and then bent at a right angle so as to become parallel to arm 14.

In use or operation, the first step in setting the trap is to apply the bait 10 (Fig. 2) between the upper portion 9 of the bait holder 8 and the end 14A of the bait engaging arm 14, with the latter flat against base 1.

This application of the bait 10 will therefore hold the arm 14 down, the outer end 5 of the striking frame 4 being then strained across to enable the holding lever 6 to engage thereover, the outer free end of this lever 6 being engaged under the horizontal portion of tripping arm 15, the trap being then in set position as shown in Fig. 2.

In such set position, the tension of the spring 2 is transmitted through the outer end 5 of striking frame 4 to the holding lever 6 and this latter in turn transmits pressure to the tripping arm 15 and its associated arm 14, so that these arms 14 and 15 tend to move upwardly but are restrained from so doing by the presence of the bait 10.

Accordingly, when the rodent or like removes the bait 10 or nibbles it away to such an extent that it ceases to be able to restrain the upward movement tendency of the arm 14, such arm 14 will move upward as shown in Fig. 3 and thus this movement will be transmitted through portion 13 to tripping arm 15, thereby allowing the holding lever 6 to become free to fly backward, and the striking frame 4 to be returned to released position at which it strikes and grips the rodent in the known manner of this type of trap.

It will be noted that with this trap the various units of mechanism all move in an upward direction in releasing the trap and therefore the trap can be covered for disguising or hiding purposes by a light layer of such material as bran, sand or such like without affecting its operation, the rodent also being well within the range of action of the striking frame when the trap is released thereby enabling catching of the largest rodents.

A trap of a size suited for catching rats will also catch mice by using a water biscuit or like as bait and inserting only one corner of said biscuit between the bait holder 8 and the end 14A of arm 14, several mice at a time being caught by this procedure due to mice nibbling around the edge of the biscuit.

Traps of small size for mice could be made and large traps applying the same mechanism could be made for animals of larger size than rats.

I claim:

1. In rodent or animal traps of the type having a wound tension spring mounted on a base and having a striking frame adapted on release to spring from side to side of said base, a fixed bait holding means, and releasing means comprising a trip lever having a pivotally secured portion and arms extending from said portion, one of said arms being movable over the outer free end of the holding lever in its cocked position and the other arm being movable into a position adjacent to said bait holder means and beneath the piece of bait in said bait holder, whereby when the bait has been removed the releasing means will be free to release the striking frame under the spring tension thereof.

2. A rodent or animal trap comprising a base having a wound tension spring secured thereto from which a striking frame extends, a holding lever pivotally secured to the base and arranged to be engaged over the outer end of the striking frame, a fixed bait holder secured to the base and provided with an upper horizontal portion, a trip lever having one portion pivotally secured to the base and having two arms extending therefrom, one of said arms being bent to be engageable over the free end of the holding lever and the other arm being bent and disposed to extend to a position adjacent to the bait holder, whereby the bait placed between the horizontal portion of the bait holder and the arm disposed thereover holds the latter arm down and the other arm over the holding lever.

TOM ERNEST WOODROFFE.